United States Patent [19]

Fruchtbaum et al.

[11] Patent Number: 5,228,825

[45] Date of Patent: Jul. 20, 1993

[54] PRESSURE VESSEL CLOSURE DEVICE

[75] Inventors: Joseph Fruchtbaum, Houston; Frederick B. Kronmiller, Tomball, both of Tex.

[73] Assignee: The M. W. Kellogg Company, Houston, Tex.

[21] Appl. No.: 786,693

[22] Filed: Nov. 1, 1991

[51] Int. Cl.⁵ .............................................. C10B 43/02
[52] U.S. Cl. ................................. 414/684.3; 292/25; 413/45
[58] Field of Search ............................ 414/684.3, 589; 220/200; 202/244, 245; 29/700, 728; 292/25, 45, 256.65; 413/26, 45, 3

[56] References Cited

U.S. PATENT DOCUMENTS 4,519,635  5/1985  McMath ............................ 29/428

FOREIGN PATENT DOCUMENTS 1076373  2/1984  U.S.S.R. ........................... 220/200

Primary Examiner—Michael S. Huppert
Assistant Examiner—Donald W. Underwood
Attorney, Agent, or Firm—John P. Ward

[57] ABSTRACT

There is disclosed a flange or pressure vessel closure device and method for deheading a coke drum. The coke drum deheading device has an annular retaining element spring biased from a lower flange of a coke drum, and a plurality of hooks which extend from the retaining element to engage a cradle holding the bottom head against the flange. When it is desired to disengage the head from the flange, the hook retaining element is moved by a first set of cylinders toward the flange to release tension from the hooks so that they can be disengaged from the bottom head by pivoting them outwardly using a second set of cylinders or other hook pivoting means. The bottom head can then be disengaged from the flange, lowered and moved laterally away from the coke drum on a hydraulic table.

14 Claims, 8 Drawing Sheets

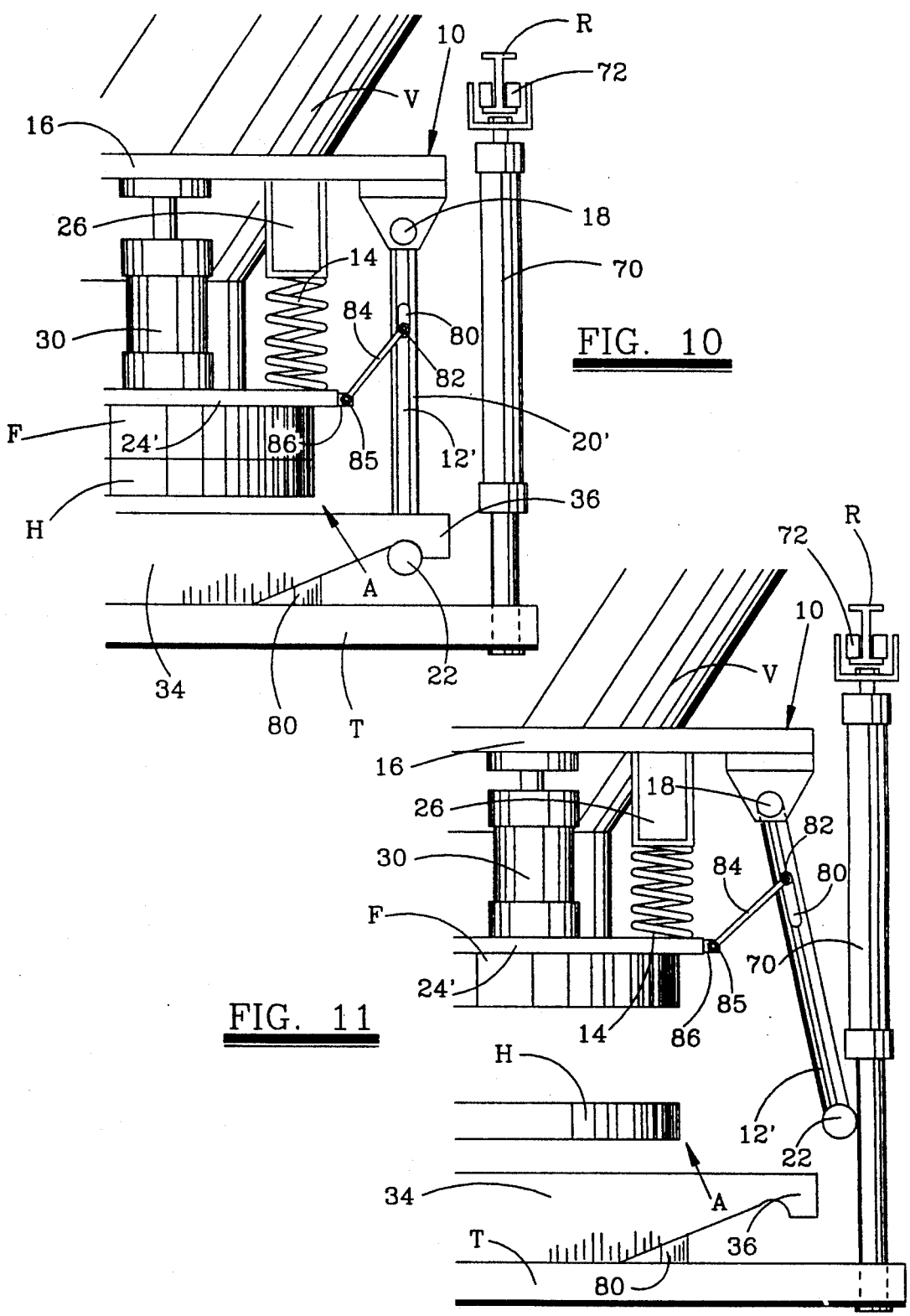

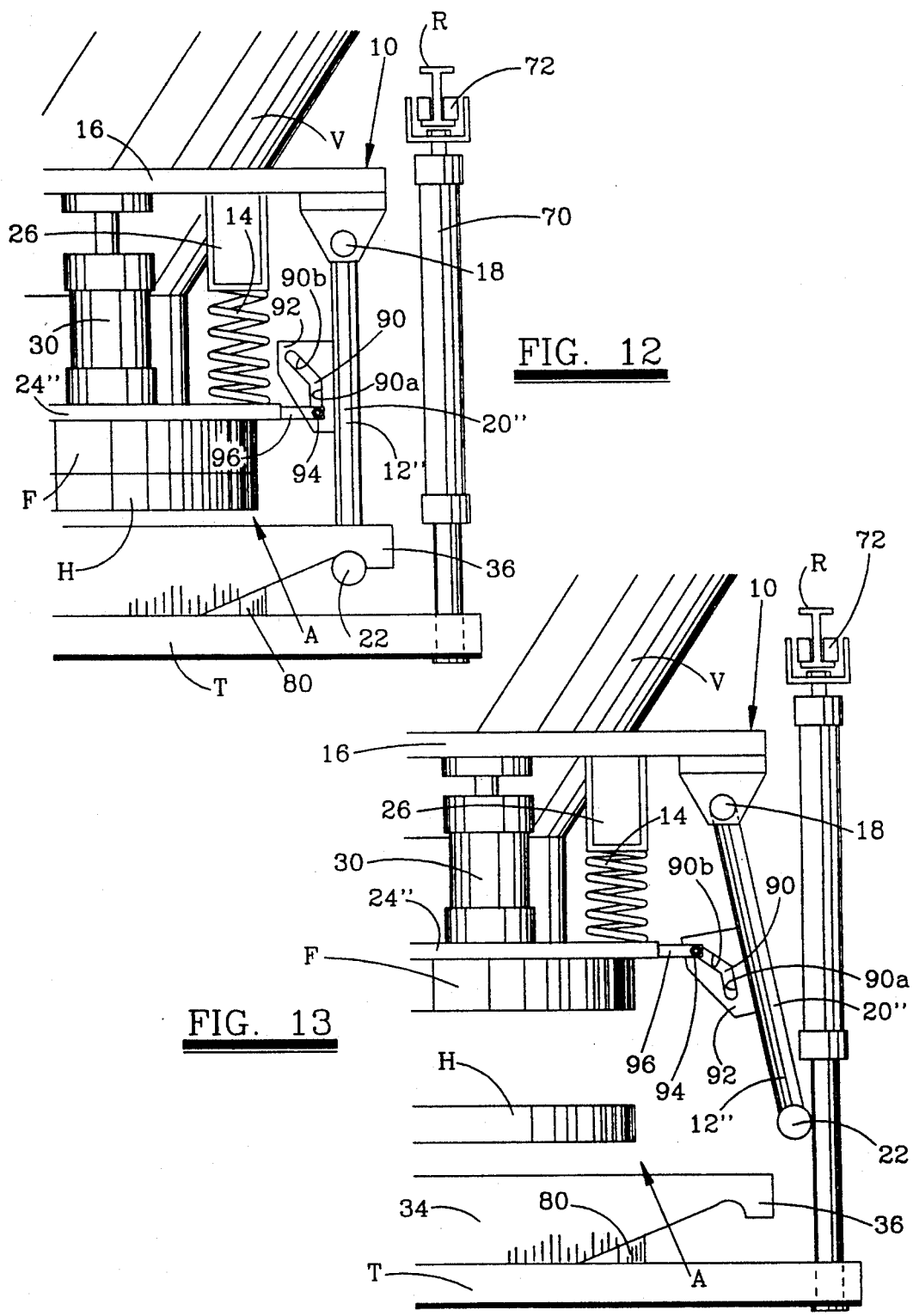

PRESSURE VESSEL CLOSURE DEVICE

FIELD OF THE INVENTION

This invention relates to a closure device for flanged connections of pipelines and pressure vessels, and more particularly to a device and method for deheading a coke drum.

BACKGROUND OF THE INVENTION

In the typical delayed coking process, high boiling petroleum residues are fed to a large vertical vessel, called a coke drum, where they are thermally cracked into light products and a solid residue, petroleum coke. When the drum is full, the feed is diverted to an empty drum. The coke-filled drum is steam purged and cooled with quench water. The drum is then drained of water, and the top and bottom heads are removed to allow the coke to be cut from the drum by high pressure water jets. When the coke is removed, the heads are replaced, and the coke drum is readied to be placed back into service to repeat the cycle.

Conventional coke drum deheading is labor intensive. The massive steel head is typically six or seven feet in diameter and as many as sixty or more bolts may be used to secure it to the drum. A cart or trolley with hydraulically elevated arms has been used to support the bottom head during unbolting and to lower the head after it is unbolted. The cart is also used to raise the head and hold it in place when it is rebolted following the coke removal procedure. It is necessary to move the head out of the way so that a chute or flume can be connected to the bottom of the coke drum to receive the coke/water mixture during coke removal. Working in the vicinity of the bottom head of the coke drum presents a number of hazards, particularly prior to coke removal. Water and other materials can fall out of the drum, because the quench water is not completely drained, or especially in the case of a shot-coke cave-in. A typical coke load can weigh as much as 240,000 pounds, and can easily exceed the capacity of the hydraulic arms and even the floor structure design load.

Various devices are available from the prior art for holding flanges together. While some of these have been very successful in other applications, none have been entirely satisfactory when used in coke drum deheading applications. For example, a sliding C-clamp has been used to hold and pressurize two flanges together. The sliding C-clamp works well when the flanges are broken apart only infrequently, but wear of the clamp due to friction between its pressurizing surfaces and the flanges is a major disadvantage in applications where the flanges are to be broken apart frequently as in coke deheading. As a consequence, the sliding C-clamp has not been used in delayed coking applications as far as applicant is aware.

A number of deheading devices intended specifically for coke drum deheading are known. For example, an article by Nagy et al., *Oil and Gas Journal*, pp. 77-80, May 29, 1989, describes a bottom head hinged to the coke drum and a pair of hydraulic cylinders used to support the head while operators manually remove the bolts. After the head bolts are removed, the hydraulic cylinders can be remotely activated to swing the head on its hinge to allow access for coke removal. While this approach eliminates the use of the deheading car and achieves some degree of safety by removing the drum head remotely, after the bolts have been removed and operating personnel are away from the drum, there are still a number of drawbacks: the bolts must still be removed manually; supporting brackets for the cylinders are welded directly to the drum shell which can reduce the life of the shell or require additional reinforcement; the hinged connection of the head to the drum prevents maintenance work on the head, i.e. cleaning and gasket replacement, until the decoking operation has been completed and the chute has been removed from the bottom of the drum; and personnel must then service the hinged head under the opened drum from which debris can fall. This device is also disclosed in EP Application No. 89-307,539.

Another type of unheading device using thirty-two swing bolts each equipped with remotely operable detensioning devices is disclosed in U.S. Pat. Nos. 4,960,358 and 4,726,109. In these disclosures, the bottom head is unbolted by disconnecting the swing bolts, lowered on a frame supported from the drum, and moved laterally on a carriage to allow access to the lower flange of the drum. This device uses a large number of moving parts which contribute to complexity and maintenance requirements, requires a specially designed or modified lower flange, head and carriage, and the frame and carriage are supported from the shell of the drum.

A closure device for coke drum deheading operations is also commercially available from Hahn and Clay under the trade designation FACT. With this rather complex device, the conventional bottom head is replaced with a custom head drilled for thirty-two bolts. The head is assembled as a sandwich with another flange or force ring of the same size as the bottom head. The head and force ring are assembled with a series of ramps located along the perimeter of the head. The assembly is held in place by the bolts and high nitrogen pressure is applied to a special force actuator located between the flanges to move them apart. Then a set of three hydraulic cylinders turn a special ramp ring to push the head upwardly from the force ring flange to hold the head in a pressurized position after the nitrogen pressure is removed. Major disadvantages of this device are wear of the ramp ring, problems related to coke accumulation between the flanges and the force ring, its complexity and the use of high pressure friction between components which can result in equipment failure and high maintenance requirements.

Accordingly, there remains a need for a pressure vessel closure device suitable for coke drum deheading which provides automated installation and removal of the drum head, avoids the use of components which are subject to rapid wear and/or high maintenance, and is relatively simple in design.

SUMMARY OF THE INVENTION

The present invention provides a pressure vessel closure device which is particularly well suited for use in coke drum deheading operations. The closure device can be completely automated, is based on simple principles of operation, uses a small number of components, avoids additional stress on the pressure vessel other than at the pressure vessel flange or other opening, and is designed to avoid using components subject to rapid wear or high maintenance requirements. The device is based on the use of springs to hold the head in place in the pressure vessel closure assembly and a relatively simple mechanism to release the springs when it is desired to open the closure assembly.

Broadly, the present invention provides a device for securing or connecting first and second flanges in mutual opposed engagement. The device includes a spring-biased hook retaining element and a hook having an end releasably engaging the second flange with the first flange disposed between the retaining element and the second flange. The hook extends longitudinally from the hook retaining element past the first flange to releasably engage the second flange. A spring is operatively associated with the hook retaining element to bias the hook retaining element longitudinally away from the first flange to tension the hook to hold the second flange tightly against the first flange. Means are provided for moving the hook retaining element toward the first flange to release tension from the hook and for disengaging the hook from the second flange. In this manner, the connection can provide, e.g., a fluid tight seal between the flanges at a gasket or opposed sealing surfaces, which can be readily disconnected and reconnected without manually removing a plurality of bolts. If desired, the flange connector/disconnector of the present invention can also be remotely operated.

In one aspect, the present invention provides a pressure vessel closure device including a flanged nozzle extending from the pressure vessel and a blind flange, or head as it is often called, in sealing contact with the flange. A hook retaining element is disposed around the nozzle between the nozzle flange and the pressure vessel, and an outwardly pivotable hook extends from the hook retaining element to releasably engage the blind flange. A spring biases the retaining element away from the nozzle flange to hold the blind flange securely against the nozzle flange. The device also includes a retractor for drawing the hook retaining element toward the nozzle flange to unbias the blind flange, and a hook releaser, preferably adapted to pivot the hook outwardly from the nozzle flange, to disengage the blind flange.

In another aspect, the present invention provides a coke drum bottom deheading device which includes a retaining element disposed concentrically around a lower end of the drum above a lower flange of the drum, and a plurality of outwardly pivotable hooks depending from the retaining element. The device also has a cradle releasably engageable by the hooks. The cradle is adapted to hold a blind flange below the lower flange of the drum. A plurality of springs are disposed to bias the retaining element upwardly from the lower flange and to tension the hooks to draw the cradle upwardly to sealingly engage the blind flange against the lower flange of the coke drum. A plurality of unlocking cylinders or other means are adapted to draw the retaining element toward the lower flange to release tension from the hooks when it is desired to remove the blind flange. A moveable car is adapted to support the cradle in an elevated position below the lower flange of the coke drum. A plurality of pivot cylinders are adapted to pivot the hooks outwardly from the lower flange and disengage the hooks from the cradle. The device also includes an elevator carriage for lowering (and raising) and laterally moving the cradle and blind flange from the coke drum.

In a preferred embodiment, the coke drum deheading device includes a plurality of pressure equalizing springs disposed between the cradle and the blind flange. This arrangement helps to provide an even pressurization of the blind flange against the lower flange of the coke drum so that a gasket or other sealing surface is evenly compressed to provide a fluid-tight seal. The coke drum bottom deheading device can also include a plurality of alignment pins extending upwardly in mutual register with a like plurality of recesses disposed between the cradle and a lower face of the blind flange to inhibit radial and lateral movement of the blind flange with respect to the cradle. The coke drum deheading device can also include a plurality of locks radially spaced around the coke drum lower flange and blind flange. Each lock preferably includes a cylinder-actuated bolt reciprocatable horizontally into and from register with a bore formed in a retaining plate. In the lock arrangement, the bolts are preferably secured to an outer periphery of the lower flange of the coke drum, and the retaining plate is affixed to an outer periphery of the blind flange.

In a further aspect of the invention, there is provided a method of opening a coke drum having a bottom head and flange assembly. The method includes the step of elevating a vertically moveable table positioned beneath the coke drum to hold the bottom head of the coke drum in mating engagement with the lower flange of the coke drum. The head is engaged against the flange by a plurality of tensioned hooks carried by a hook retaining element spring biased against the lower flange. The deheading method further includes the steps of drawing the hook retaining element toward the lower flange to release tension from the hooks, pivoting the hooks outwardly to disengage the head from the hooks, and lowering the table with the head supported thereon. The method can also include the step of withdrawing a plurality of locking bolts from a like plurality of retaining bores wherein each locking bolt is mounted to either the head or the flange, and the retaining bores are formed in the other of the head or the flange to register with the locking bolts.

In a still further aspect of the invention, there is provided a method of closing a bottom head of a coking drum. The method includes the steps of: positioning the head with a vertically moveable table below a lower flange of a coking drum in engagement therewith; inwardly pivoting a plurality of hooks depending from a hook retaining element disposed above the lower flange to position lower ends of the hooks for engaging the head; spring biasing the hook retaining element upwardly from the lower flange to tension the hooks and engage the bottom head to form a fluid-tight seal against the lower flange; and lowering the table away from the bottom head. The bottom head may be supported by a cradle having hook receiving elements adapted to engage the lower ends of the hooks during the spring biasing step. The method can also include evenly distributing pressure between the lower flange and the head with a plurality of springs disposed between the cradle and the head. The method can also include aligning the bottom head with the flange by registering a plurality of guide pins in alignment recesses disposed between the lower flange and the bottom head. In a preferred embodiment, the coke drum closure method includes the step of locking the bottom head in place against the lower flange by inserting a plurality of horizontally reciprocatable bolts mounted on an outer edge of either the bottom head or the lower flange into register with a like plurality of bolt receiving recesses formed in the other of the bottom head or the lower flange. The hook retaining element is preferably mechanically lowered toward the lower flange against a force exerted by one or more springs acting on the hook retaining elements during the hook pivoting step, and the mechanical lowering device is released in the spring biasing step.

BRIEF DESCRIPTION OF THE DRAWINGS

FIG. 10 is a side perspective view of a hook pivoting mechanism of an alternate embodiment of the invention shown with the hook in a raised, unpivoted position;

FIG. 11 is a side perspective view of the hook of FIG. 10 shown with the hook in a lowered, outwardly pivoted position;

FIG. 12 is a side perspective view of a hook pivoting mechanism of another alternate embodiment of the invention shown with the hook in a raised, unpivoted position; and FIG. 13 is a side perspective view of the hook of FIG. 12 shown with the hook in a lowered, outwardly pivoted position.

DETAILED DESCRIPTION OF THE INVENTION

Figure 1:
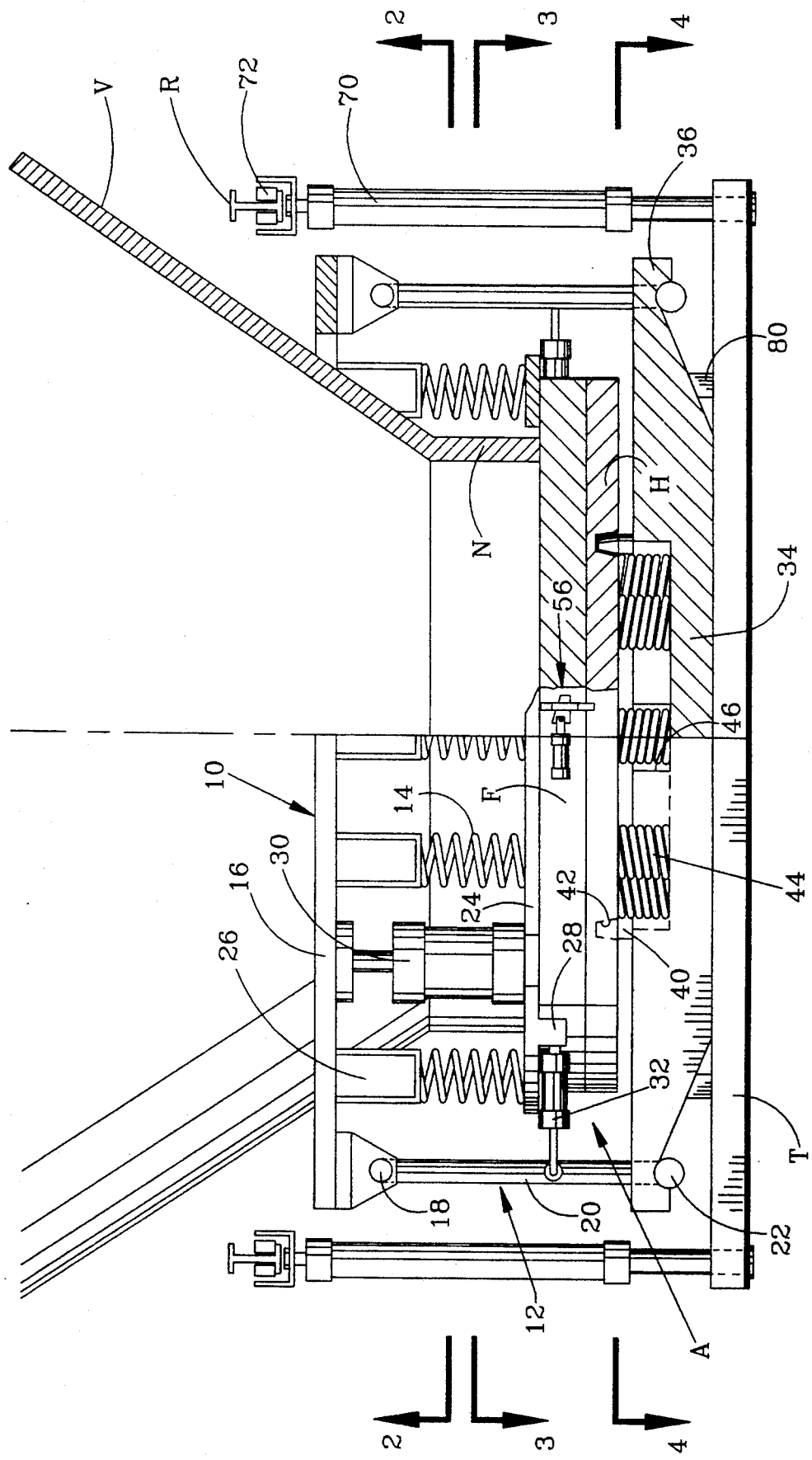
FIG. 1 is an elevation, partially cut away, of a coke drum deheading device shown with the bottom head in place to close the coke drum in accordance with an embodiment of the present invention.
Figure 2:
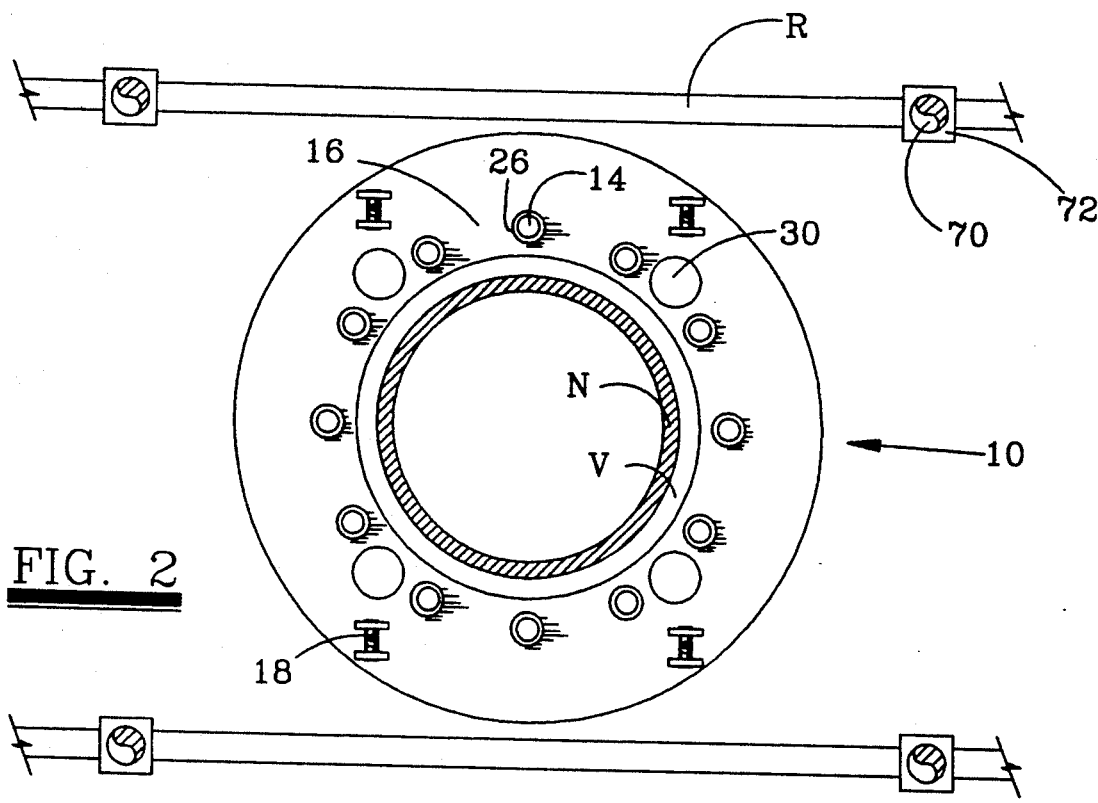
FIG. 2 is a cross-sectional view of the device of FIG. 1 as seen along the lines 2—2.
Figure 8:
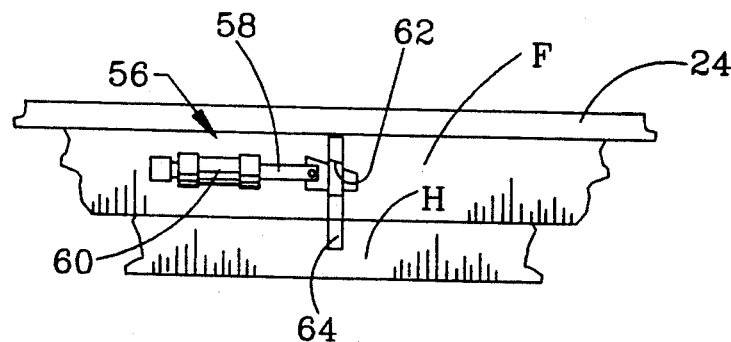
FIG. 8 is a side perspective view, partially cut away, of a locking device for the coke drum head shown in a locked position according to an embodiment of the present invention.
Figure 9:
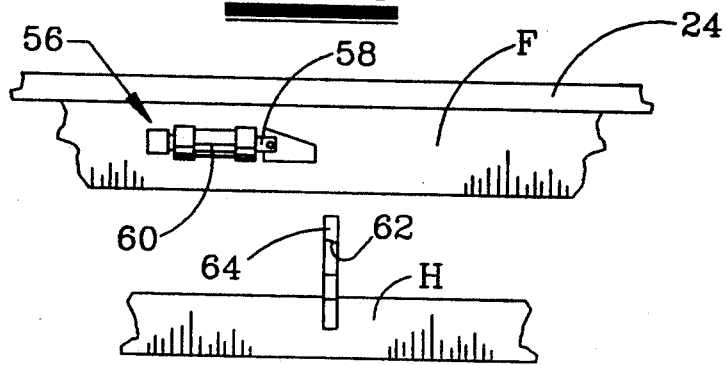
FIG. 9 is a side perspective view, partially cut away, of the device of FIG. 8 shown in an unlocked position.
Figure 3:
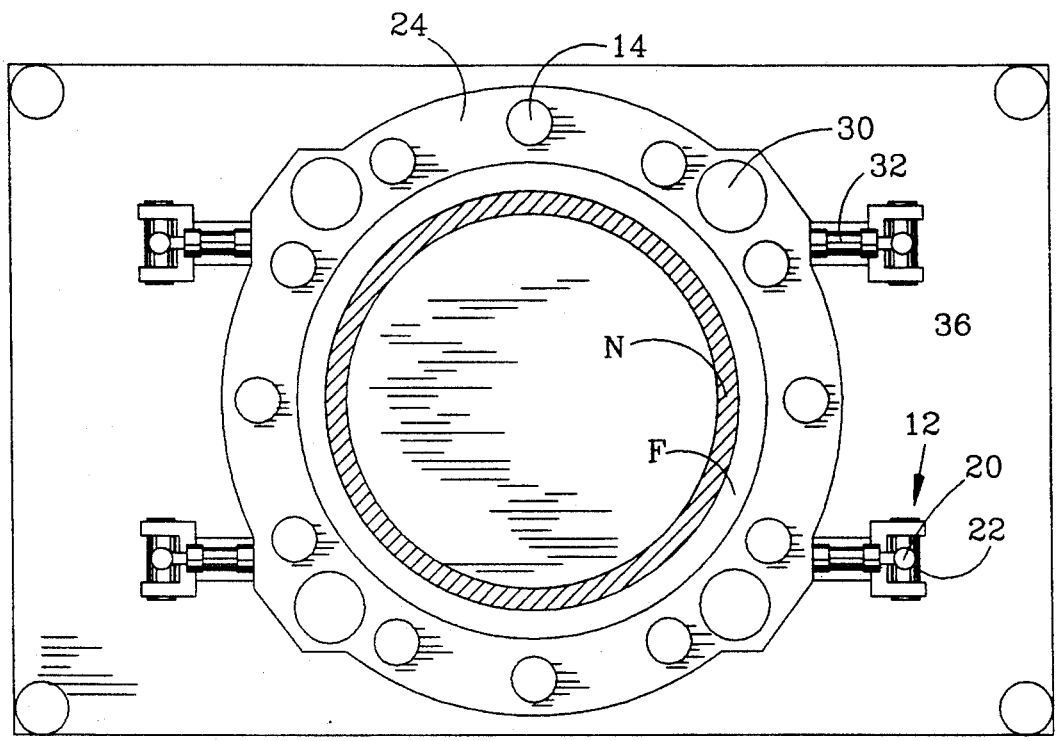
FIG. 3 is a cross-sectional view of the device of FIG. 1 as seen along the lines 3—3.

Referring now to the drawings in which like reference numerals and letters depict like parts, there is shown a pressure vessel V which can be, for example, a coke drum used in the delayed coking process. The vessel V is equipped with a head assembly A which includes a lower flange F at the lower end of a nozzle N serving as an opening into the vessel V, and a generally circular plate or bottom head H, also known as a blind flange, secured against the flange F for sealing the vessel v with a suitable gasket (not shown) and/or other sealing surfaces formed in the respective flange F and head H. The bottom head H can be connected to a conventional inlet tube or other piping (not shown).

The head assembly A is closed in accordance with the present invention with retaining element 10, hooks 12 and springs 14. The retaining element 10 includes an annular plate 16 disposed around the nozzle N, and is preferably radially spaced therefrom to allow free longitudinal movement toward and away from flange F. That is, the annular plate 16 preferably has an inside diameter larger than the outside diameter of the nozzle N and the outside diameter of the vessel V adjacent to the nozzle N where the annular plate will move. The annular plate 16 preferably has an outside diameter larger than the outside diameter of the flange F so that hooks 22 can extend downwardly from the annular plate 16 without interference from the flange F. The annular plate 16 serves to transfer force from the springs 14 to the hooks 12, and to balance lateral forces resulting from differences in radius between the circles along which the hooks 12 and the springs 14 are disposed.

A plurality of the hooks 12 depend from the annular plate 16. The hooks 12 generally include an elongated section 20 extending from a pivot connection 18 mounted on a lower face of the annular plate 16 to a lower end 22 which terminates in a T-bar adapted to be engaged to transmit force to the head H. The pivot connections 18 allow the hooks 12 to pivot outwardly from the flange F during the deheading operations described in more detail below. The hooks 12 are preferably evenly spaced along the outer perimeter of the annular plate 16 to evenly distribute a closure force to the head H. Although any number of the hooks 12 may be employed, provided there are at least three, it is preferred to use four or more of the hooks 12.

The springs 14 are disposed around the flange F to bias the retaining element 10. The springs 14 should be evenly radially spaced to evenly distribute a biasing force against the retaining element 10. The springs are preferably supported on an annular support plate 24 disposed between a lower end of the springs 14 and an upper surface of the flange F. The support plate 24 preferably has a generally annular shape with an inside diameter smaller than the outside diameter of the flange F and larger than the outside diameter of the nozzle N to engage the upper surface of the flange F. The plate 24 can also have an outside diameter larger than the flange F to provide an enlarged surface area for supporting the springs 14 and/or cylinders 30, especially if the upper surface area of the flange F is not sufficient for this purpose. If the upper surface is sufficiently large, the plate 24 need not be used and the springs 14 and cylinders 30 can be supported directly on the flange F. Some or all of the springs 14 can also be housed in the cylinders 30.

The upper ends of the springs 14 are secured with retaining cups 26 or other suitable spacing elements. The springs 14 should be designed for compression to bias the annular plate 16 away from the flange F with sufficient force to develop adequate tension in the hooks 12 to sealingly engage the bottom head H against the flange F. The springs 14 should also be sufficiently compressible to allow the annular plate 16 to travel, as by drawing or pushing, toward the flange F to facilitate disengagement of lower ends 22 of the hooks 12. Alternatively, but less desirably because of the load placed on the wall of the vessel V, the springs 14 could be positioned between the vessel V and the retaining element 10 and bias the retaining element by elongation of the springs 14 to exert an upward pulling force similar to the force obtained by the spring compression or pushing in the preferred embodiment.

A plurality of cylinders 30 are disposed between the annular plate 16 and the supporting plate 24 to draw the retaining element 10 downwardly toward the flange F during deheading operations. In normal use when it is desired to keep the vessel V sealed, the cylinders 30 are depressurized so that the primary forces on the retaining element 30 are the springs 14 and the hooks 12. Although cylinders 30 are preferred, any suitable mechanism for drawing or pushing the retaining element 10 against the force of the springs 14 towards the flange F may be employed, such as, for example, gears, rack and pinion, cable and the like.

As an alternate configuration, as previously mentioned, the cylinders 30 can also house respective springs 14. In this arrangement, the spring force is transmitted through a rod attached to a piston disposed in each of the cylinders 30. Similarly, the hooks 12 can also be made as a part of the hydraulic cylinder rod. With the retaining element 10, hooks 12 and springs 14 integrated in this manner, a hook 12 and a spring 14 are each operatively associated with a single, independent cylinder 30. However, the preferred annular plate 16 advantageously provides a retaining element 10 which serves as a connection between the hooks 12, springs 14 and cylinders 30 so that the quantity, size and location of the hooks 12, springs 14 and cylinders 30 can be independently selected.

A pivot cylinder 32 is operatively associated with each hook 12. Preferably, each pivot cylinder 32 is positioned on an outer edge of the flange F or, more preferably, support plate 24 as illustrated best in FIGS. 1 and 5. One end of each pivot cylinder 32 is conveniently pivotally attached to bracket 28 depending from an outer edge of the support plate 24, and the other end of the pivot cylinder 32 is secured to an elongated section 20 of one of the hooks 12, preferably with an enlarged bore or slot formed in the elongated section 20 to allow sufficient play when the hooks 12 are moved vertically. The pivot cylinders 32 are activatable to pivot the hooks 12 outwardly from the flange F. Since the hooks 12 generally depend from the retaining element 10, the pivot cylinders 32 are only required to have sufficient strength to push against the weight of the hooks 12 when the hooks 12 are disengaged from holding the bottom head H.

The lower ends 22 of the hooks 12 are adapted to transmit force from the elongated section 20 of the hooks 12 to the bottom head H. Preferably, the hooks 12 engage a cradle 34 which sandwiches the bottom head H against the flange F for sealing engagement therewith. The cradle 34 has a body which engages the head H and supports it tightly against the flange F. The cradle 34 includes a respective fork 36 for each hook 12 which is adapted to receive the lower end 22 of the hook 12 and retain the lower end 22 of the hook 12 when the elongated section 20 is tensioned by biasing of the annular plate 16 upwardly by means of the springs 14. The forks 36 are also adapted to disengage and release the respective lower end 22 of the hooks 12 when the annular plate 16 is drawn towards flange F and the lower end 22 of the hook 12 moves downward so it becomes spaced longitudinally from the fork 36.

Preferably, a plurality of guide pins 40 or other suitable projections extend upwardly from the body of the cradle 34 into mutual register with recesses 42 formed in the opposing surface of the bottom head H to radially align the cradle 34 and bottom head H and inhibit lateral and angular movement thereof during heading and deheading operations. If desired, a contact or proximity switch (not shown) can be operatively associated with the guide pin 42/recesses 40 for an indication of alignment and/or data input to a control device. A plurality of pressure equalizing springs 44 can be radially disposed in retaining recesses 46 formed in the body of cradle 34 to evenly transit force from the cradle 34 to the bottom head H. This may be necessary in some applications to evenly compress the gasket, and/or other opposed sealing surfaces between the flange F and the bottom head H, to adequately prevent leakage between the points where the hooks 12 engage the cradle 34. Alternatively, the hooks 12 can directly engage the bottom head H, provided the hooks 12 are of sufficient number to evenly seal the head assembly A. The use of the cradle 34 and the pressure equalizing springs 44 simplifies the deign by allowing fewer hooks 12 to be employed.

Figure 4:
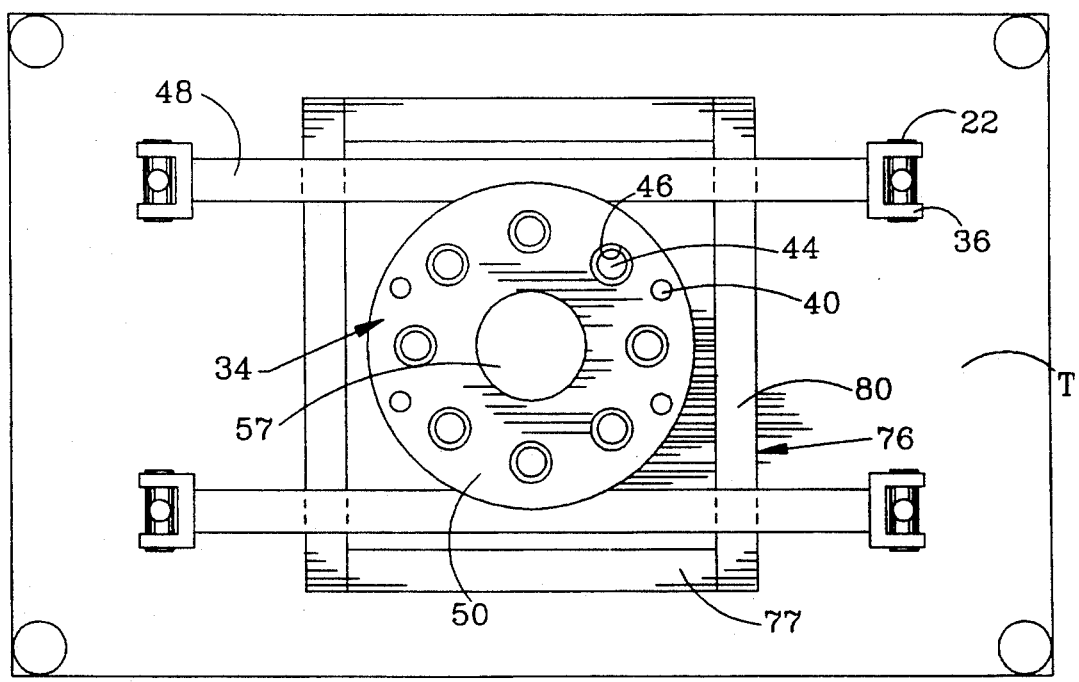
FIG. 4 is a cross-sectional view of the device of FIG. 1 as seen along the lines 4—4.

The cradle 34 is preferably constructed from a pair of transverse beams 48 secured at opposite sides of a circular plate 50 as best illustrated in FIG. 4 Each of the transverse beams 48 terminates at a respective fork 36 to engage lower end 22 of each of the hooks 12. The recesses 46 which receive the pressure equalizing springs 44 are formed in the plate 50 in a circular pattern. The cradle 34 should have a body adapted to accommodate any tubing, instrumentation, pipe fittings and any other appurtenances (not shown) affixed to the bottom head H. Thus, the circular plate 50 can be apertured as at 57 or as otherwise required to accommodate any appurtenances in the bottom head H.

Figure 7:
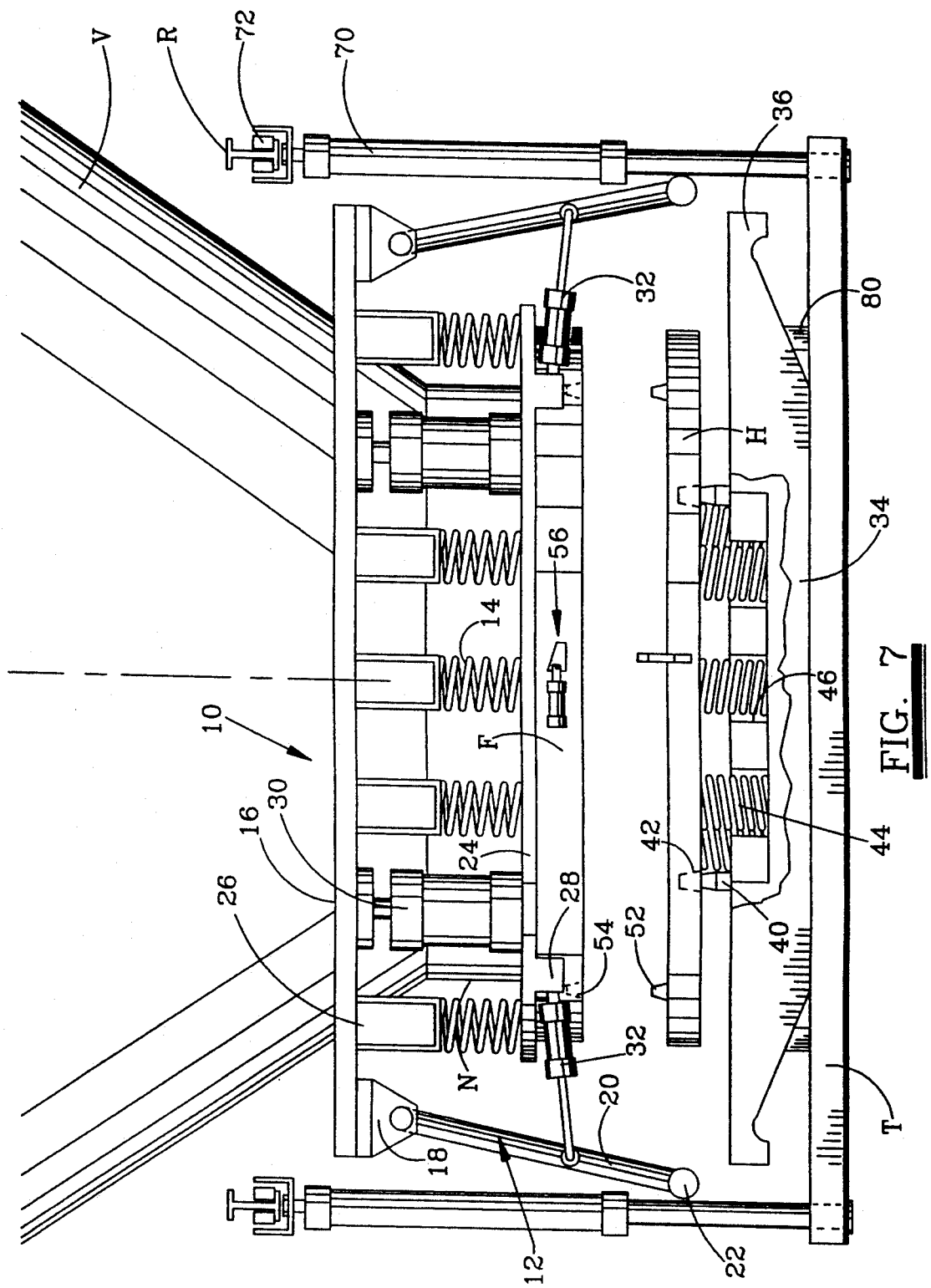
FIG. 7 is an elevation of the device of FIG. 1 with the head lowered from the coke drum.

If desired, the head H may be aligned with the flange F by means of a plurality of head alignment pins 52 received in mutual register in a like plurality of head alignment recesses 54. As best illustrated in FIG. 7, the head alignment pins 52 project upwardly from the head H for engagement into the recesses 54 formed in a lower face of the flange F, although the guide pins 52 could alternatively project downwardly from the flange F into recesses 54 formed in the head H, or a combination of upwardly or downwardly projecting guide pins 52 could be used. If desired, a contact or proximity switch (not shown) can be operatively associated with one or more of the guide pins 52/recesses 54 for an indication of alignment and/or data input to a control device.

As an additional feature, the bottom head H can optionally be locked in place when positioned against the flange F by means of locking mechanism 56. The locking mechanism 56 serves to retain the bottom head H in place against the flange F if the hooks 12 should be inadvertently, prematurely or accidentally disengaged from the cradle 34, or otherwise fail to hold the cradle 34. The locking mechanism 56 preferably includes a bolt 58 which is horizontally reciprocatable tangentially along an outer edge of the head assembly A. The bolt 58 can be hydraulically or pneumatically operated by the cylinder 60 mounted on an outer edge of the flange F, or alternatively the bolt 58 and cylinder 60 could be mounted on the bottom head H. The bolt 58 is slideable into engagement with a bore 62 formed in a bolt retainer plate 64 mounted on an outer edge of the bottom head H, or alternatively, on an outer edge of the flange F if the cylinder 60 and bolt 58 are mounted on the bottom head H. At least two locks 56 should be radially spaced around the periphery of the assembly A to hold the bottom head H, but more than two can be used if desired.

The head assembly A is conveniently installed by welding, bolting or otherwise securing together sections of the annular plate 16 and support plate 24 around the nozzle N and securing the support plate 24 to the flange F. The remaining elements are secured to the annular plate 16, support plate 24, flange F and/or bottom head H, if not already mounted or positioned prior to installation of the annular plate 16 and/or support plate 24. In this manner, a conventional coke drum may be retrofitted with the deheading device according to the present invention without substantial modification of the existing equipment, other than mounting the locking mechanism 56 and/or forming the head alignment pins 52 and recesses 54. The cylinders 30, 32 and 60 are connected to appropriate hydraulic fluid or pneumatic supply source(s) and can preferably be operated remotely from a location away from the vicinity of the assembly A. Conveniently, the same source of hydraulic fluid or pneumatic air supply, with appropriate regulation for the appropriate pressure, can be used for operating each cylinder.

When it is desired to dehead the coke drum, a table T is positioned beneath the pressure vessel v. The table T can be conventionally mounted on a moveable cart equipped with a hydraulic lift to elevate the table. Alternatively, in the preferred embodiment illustrated in FIGS. 1-7, the table T is suspended from overhead rails R by means of cylinders 70 disposed at each of four corners of table T. The rails R can be supported from structure in the area of the coke drum if the design load is adequate, or less desirably directly from the vessel v. A roller 72 is associated with each cylinder 70, and can be motor driven to facilitate positioning of the table T by moving it along the rails 72 Once in position, the table T is elevated by appropriately pressurizing cylinders 70 with a hydraulic fluid or pneumatically, as desired, to engage the table T against the cradle 34 as best illustrated in FIG. 1. The table T may be modified to include a bed 76 adapted to receive the cradle 34 (and any appurtenances of the bottom head H protruding therethrough) so that the cradle 34 is maintained in alignment. The bed 76 can include, for example, longitudinal stop members 77 and transverse stop members 80 contoured to register with the outline of the cradle 34, e.g. longitudinal members 77 disposed alongside beams 48 and transverse members 80 bevelled at an upward face to engage a sloping downward face of beam 48.

Figure 5:
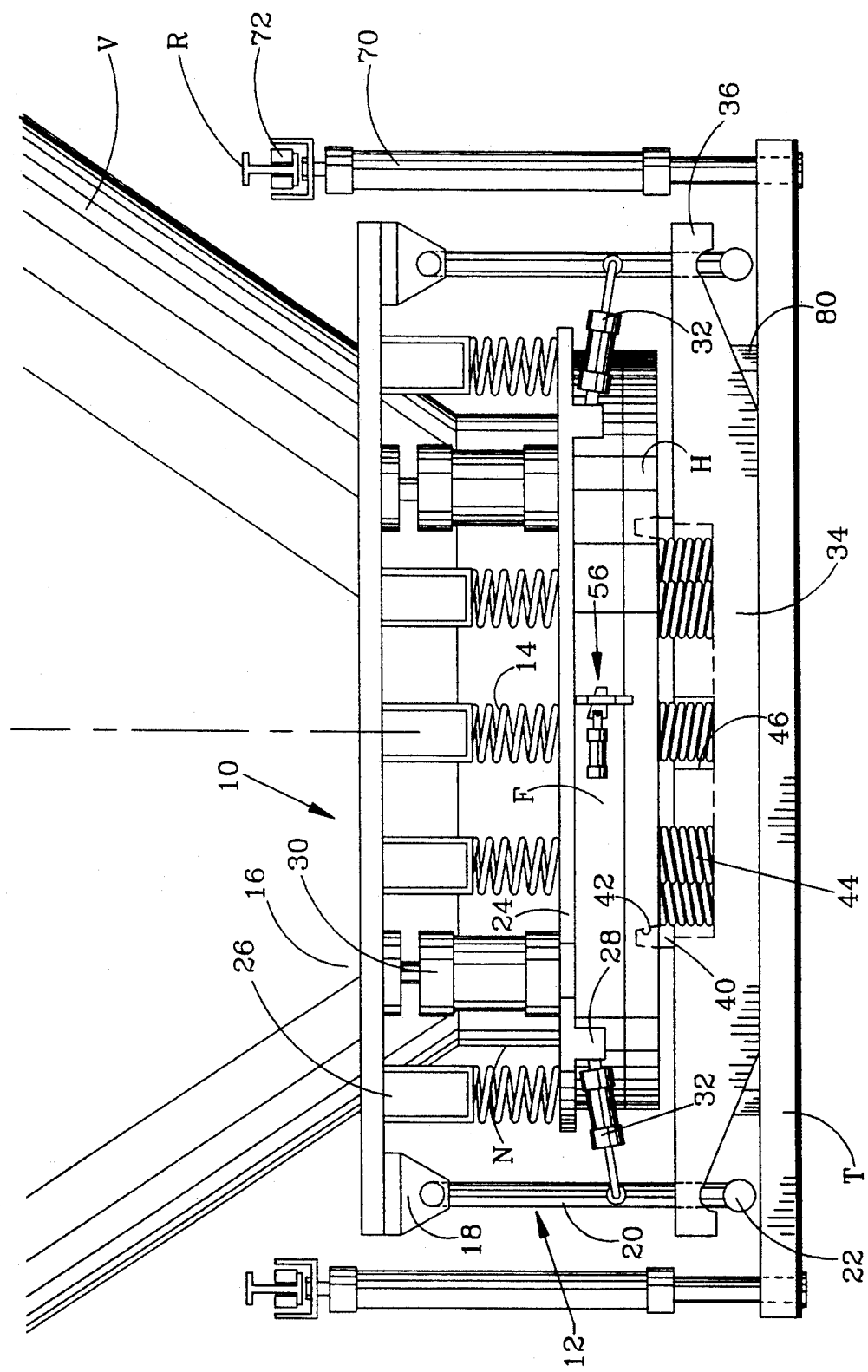
FIG. 5 is an elevation of the device of FIG. 1 in which hooks are lowered by drawing a hook retaining element toward a lower flange of the coke drum in the deheading procedure.

After the table T is positioned to engage the cradle 34 as best illustrated in FIG. 1, the cylinders 30 are pressurized to draw the annular plate 16 downwardly toward the flange F. This is desirably effected by actuating the cylinders 30 from a remote location. The downward movement of retaining element 10 compresses the springs 14 and causes the lower ends 22 of the hooks 12 to descend with respect to the cradle 34 which is held securely in place against the head H by the support of table T as best illustrated in FIG. 5. As mentioned previously, the cylinders 32 are pivotally mounted to bracket 28 and/or connected to the elongated section 20 of each of the hooks 12 by means of an enlarged bore or slot to facilitate downward movement of the hooks 12 Without interference from the cylinders 32.

Figure 6:
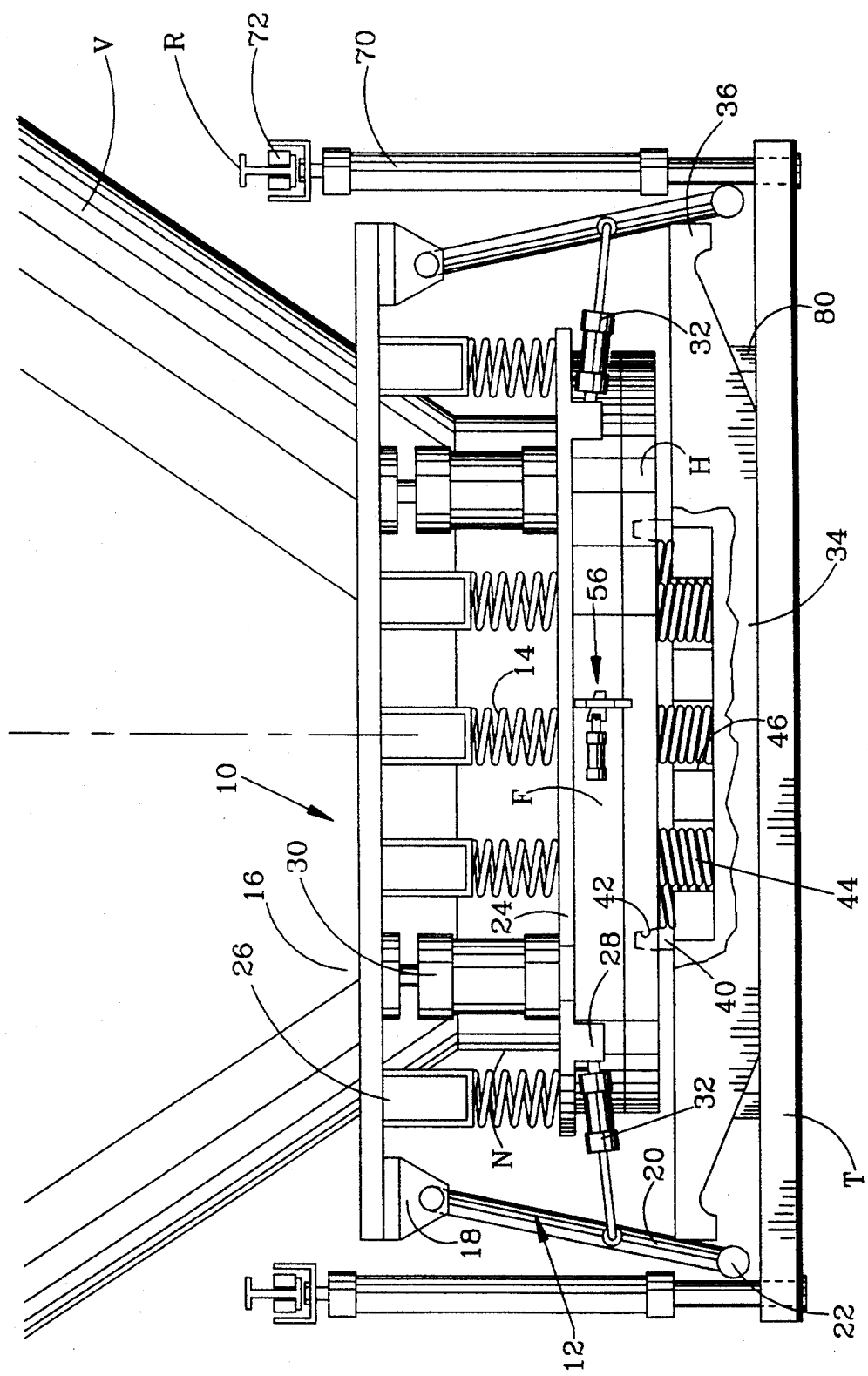
FIG. 6 is an elevation of the device of FIG. 1 with the hooks pivoted outwardly in the coke drum deheading/closure procedure.

The cylinders 32 are then pressurized, preferably from a remote location, to pivot the hooks 12 radially outwardly from the flange F to disengage lower ends 22 of the hooks 12 from the forks 36 of the cradle 34, as best illustrated in FIG. 6. The forks 36 are preferably adapted so that the lower end 22 of each hook 12 is not releasable unless the cradle 34 is held upwardly against the assembly A by the table T.

After the hooks 12 are outwardly pivoted, cylinder 60 is activated, preferably from a remote location, to slide the bolt 58 from the bore 62, and any additional locking devices are deactivated. The table T supporting the cradle 34 and bottom head H is then lowered hydraulically by extending the cylinders 70 as best illustrated in FIG. 7. As the table T is lowered, the bottom head H may initially rise with respect to the cradle 34 as compression is removed from the springs 44. As the table T is lowered further, the bottom head H descends on the cradle 34 which is, in turn, supported on the table T. When it is sufficiently lowered, the table T, carrying the cradle 34 and the bottom head H, can be moved longitudinally along the overhead rails R as desired.

During raising, lowering and lateral movement, the bottom head H is maintained in alignment with respect to the cradle 34 by means of the guide pins 40 and recesses 42, and cradle 34 is similarly maintained in alignment with respect to table T by means of bed 76, as described above. This alignment can be important if unconsolidated coke is retained on an upper surface of the bottom head H as it is lowered from the flange F and there is not sufficient clearance from the unconsolidated coke to move the table T longitudinally on the rails R without the unconsolidated coke hitting or dragging against the flange F or other obstructions. Without alignment, the cradle 34 and/or head H could be moved longitudinally and become misaligned for replacement.

Normally, the pressure vessel V will be emptied of petroleum coke before the bottom head H is replaced in the assembly A. Since the bottom head H can be removed from the vicinity of the flange F, it can be serviced while the coke is being removed from the vessel V. Such servicing typically includes cleaning, gasket replacement, checking for wear or other damage, etc. When it is desired to replace the bottom head H, the table T is moved along the rails R into position below the vessel v so that the bottom head H is directly below the flange F The cradle 34 and bottom head H are raised by means of cylinders 70 to engage the flange F (see FIG. 6). The guide pins 52 and recesses 54 serve to align the bottom head H against the flange F, and a proximity or contact switch (not shown) can be used as a positive indication of proper alignment. The cylinders 32 are then activated (or deactivated) to pivot the hooks 12 inwardly so that the lower ends 22 are in vertical alignment with the hooks 36 for engagement therewith. The cylinders 30 are then released so that the springs 14 bias the retaining element 10 upwardly from the flange F. The hooks 12, in turn, engage the forks 36 and securely hold the bottom head H in place against the flange F. The pressure equalization springs 44 function to transmit force to the head H in a radially evenly distributed pattern to inhibit leakage between the points of support. The locking mechanisms 56 are then engaged, and the table T can be lowered and/or moved away as desired.

While one embodiment of hook 12 pivoting is described above, with the preferred cylinders 32, it is understood that the particular mechanism for pivoting the hooks outwardly from the flange F can take various forms. Other suitable hook-pivoting means may be employed, such as, for example, screws, gears, cables, pulleys or the like. The hook-pivoting means are preferably remotely operable or automatic so that personnel do not need to be near the vessel v when the bottom head H is removed. One alternate embodiment is illustrated in FIGS. 10 and 11. The hook 12' is provided with a longitudinal slot 80 slideably receiving a transverse pin 82 therein. The pin 82 is mounted at an outer end of an arm 84 which has an inner end 85 pivotally attached to a bracket 86 mounted peripherally on the support plate 24'. When the retaining element 10 is lowered, the pin 82 initially slides up in the slot 80 as the hook 12' travels vertically downward. When the pin 82 engages an upper end 88 of the slot 80, further downward movement of the hook 12' results in outward pivoting of the hook 12' by reaction of the arm 84 at its pivotable end 85 against the bracket 86. The pivoting allows the lower end 22 of the hook 12' to be disengaged from the bottom head H as otherwise described. When the hook 12' is in a raised position, the reactive force on the arm 84 is released and the hook 12' is in its generally upright disposition.

In another alternate embodiment shown in FIGS. 12 and 13, the hook 12" is provided with a guide slot 90 formed in a lateral extension 92 of the elongated section 20" formed from a plate affixed thereto. The guide slot 90 slideably receives a pin 94 at an outer end of an arm 96 mounted peripherally on plate 24". The slot 90 includes a lower, generally vertical portion 90a and an upper, inwardly sloped portion 90b. When the hook 12" is lowered, the pin 94 initially slides in the lower slot portion 90a to adjacent the upper slot portion 90b corresponding to a sufficient lowering of the hook 12" to disengage the lower end of the hook 12" from the bottom head H as otherwise described. Upon further downward movement of the hook 12", the pin 90 slides in the sloped slot portion 90b to pivot the hook 12" outwardly from the flange F. Thus, the slot 90 serves to define the lateral disposition and pivoting movement of the hook 12".

The foregoing description is of a preferred embodiment of the invention for use with a coke drum, and particularly in the bottom deheading procedure. It is to be understood that the foregoing is only illustrative of embodiments so that those of ordinary skill in the art are enabled to practice the invention and understand the best mode contemplated. However, the invention is equally applicable to the top head of a coke drum, as well as to other types of pressure vessels, and can also be used in connection with the closure of flanges, in general, e.g. in connecting tubular joints, in connecting a flange to a pressure vessel, in connecting a flanged pipe to a pressure vessel, and the like. Further, various modifications in the size, shape and materials of the various components will occur to those skilled in the art in view of the foregoing description. It is intended that all such applications, modifications and variations encompassed by the scope or the spirit of the appended claims be embraced thereby.

What is claimed is:

1. A coke drum deheading device comprising:
a retaining element disposed concentrically around a lower end of the coke drum above a lower flange thereof;
a plurality of outwardly pivotable hooks depending from the retaining element;
a cradle releasably engageable by the hooks, the cradle adapted to hold a bottom head below the lower flange of the coke drum;
a plurality of springs mounted between the retaining element and the lower flange of the coke drum to tension the cradle upwardly to sealingly engage the bottom head against the lower flange of the coke drum;
a plurality of means adapted to move the retaining element toward the lower flange to tension the springs and to release tension from the hooks,
a means for pivoting the hooks outwardly from the lower flange and disengaging the hooks from the cradle;
a means for raising and lowering the cradle and the bottom head to and from the lower flange of the coke drum.

2. The device of claim 1, comprising a plurality of pressure equalizing springs disposed between the cradle and the bottom head.

3. The device of claim 2, further comprising a plurality of alignment pins in mutual register with a like plurality of bores formed between the cradle and a lower face of the bottom head to inhibit radial and lateral movement of the bottom head with respect to the cradle.

4. The device of claim 1, comprising a plurality of locks radially spaced around the coke drum lower flange and bottom head, each lock comprising a cylinder-actuated bolt reciprocatable horizontally into and from register with a bore formed in a retaining plate.

5. The device of claim 4, wherein the bolts are secured to an outer periphery of the lower flange and the retaining plate is affixed to an outer periphery of the bottom head.

6. The device of claim 1, wherein the pivoting means comprise a plurality of pivot cylinders disposed between each hook and the lower flange.

7. A method for bottom deheading a coke drum, comprising the steps of:
elevating a vertically moveable table positioned beneath the coke drum to engage and support a cradle and a bottom head of the coke drum, the cradle being held below the coke drum by a plurality of tensioned hooks depending from a hook retaining element disposed concentrically around a lower end of the coke drum and above a lower flange thereof and spring-biased upwardly from the lower flange and the bottom head being carried by the cradle in sealing engagement with the lower flange of the coke drum;
moving the hook retaining element against the spring bias toward the lower flange to release tension from the hooks;
pivoting the hooks outwardly to disengage the hooks from the cradle; and
lowering the table with the cradle and bottom head supported thereon away from the lower flange of the coke drum.

8. The method of claim 7, further comprising the step of withdrawing a plurality of locking bolts from a like plurality of respective retaining bores, wherein each locking bolt is mounted to either the bottom head or the lower flange and each respective retaining bore is formed in the other of the bottom head or the lower flange to register with the locking bolts slideable therein, subsequent to elevating the table to engage and support the cradle and bottom head and prior to lowering the table with the cradle and bottom head supported thereon.

9. A method of closing a bottom head of a coke drum, comprising the steps of:
elevating a vertically moveable table positioned below a lower flange of the coke drum and supporting a cradle having a plurality of hook receiving elements, the cradle carrying the bottom head, to position the bottom head against the bottom flange;
inwardly pivoting a plurality of hooks depending from a hook retaining element disposed concentrically around a lower end of the coke drum and above the lower flange to position lower ends of the hooks for engaging the plurality of hook receiving elements of the cradle;

spring-biasing the hook retaining element upwardly from the lower flange to tension the hooks and sealingly engage the bottom head against the lower flange; and lowering the vertically movable table away from the cradle.

10. The method of claim 9 further comprising the step of locking the bottom head in place against the lower flange with a plurality of horizontally mounted bolts on either the head or the lower flange slideably reciprocated into register with a likc plurality of respective ball-receiving recesses formed in the other of the bottom head or the lower flange, subsequent to elevating the table supporting the cradle and bottom head to position the bottom head against the bottom flange and prior to lowering the vertically movable table away form the cradle.

11. The method of claim 9, wherein the hook retaining element is mechanically lowered toward the lower flange against a force exerted by one or more springs acting on the hook retaining element during said hook pivot step, and said retaining element is released in said spring-biasing step.

12. The method of claim 11, wherein said mechanical lowering is effected by cylinders disposed between the lower flange and the hook retaining element.

13. The device of claim 1 further comprising a moveable car adapted to support the cradle and the bottom head held by the cradle in an elevated position adjacent the lower flange of the coke drum.

14. The method of claim 9 further comprising the step of providing a plurality of springs disposed between the cradle and the bottom head to evenly distribute and pressure between the lower flange and the bottom head as provided by the plurality of hooks engaging the cradle.

* * * * *